United States Patent [19]

Lochmann et al.

[11] 4,056,580

[45] Nov. 1, 1977

[54] METHOD FOR PREPARATION OF METHACRYLATE AND ACRYLATE POLYMERS AND COPOLYMERS BY ANIONIC POLYMERIZATION

[75] Inventors: Lubomir Lochmann; Jiri Trekoval, both of Prague, Czechoslovakia

[73] Assignee: Ceskoslovenska akademie ved, Prague, Czechoslovakia

[21] Appl. No.: 525,854

[22] Filed: Nov. 21, 1974

[30] Foreign Application Priority Data

Nov. 26, 1973 Czechoslovakia .................. 8136/73
May 24, 1974 Czechoslovakia .................. 3734/74
July 3, 1974 Czechoslovakia .................. 4690/74

[51] Int. Cl.$^2$ .......................... C08F 2/00; C08F 4/46; C08F 20/10; C08F 293/00
[52] U.S. Cl. ...................................... 260/881; 260/885; 526/79; 526/173; 526/174; 526/175; 526/178; 526/181; 526/194; 526/328; 526/341
[58] Field of Search .................. 260/89.5 A, 86.1 E, 260/85.5 ES, 85.5 R, 881, 885, 89.55; 526/173, 174, 175, 178, 181, 194, 79

[56] References Cited

U.S. PATENT DOCUMENTS

2,841,574 7/1958 Foster ............................ 260/89.5 A
3,761,529 9/1973 Drahoslan et al. ............. 260/89.5 A

FOREIGN PATENT DOCUMENTS

7,406,069 11/1974 Netherlands.

OTHER PUBLICATIONS

C.A. 53770 "Properties & Prep. of Pure Lithio Esters of Some Carboxylic Acids" Lochmann et al., vol. 79 01.
C.A. vol. 76, No. 12, 60174p "Mech. of Initiation of Methyl Methacrylate With Lethium Test-Alkoxides," Trekoval et al.
C.A. vol. 82, No. 14 868884 "Polymethacrylates by Anionic Polymerization" Lochmann et al.

*Primary Examiner*—Herbert J. Lilling

[57] ABSTRACT

The invention relates to anionic polymerization and copolymerization of methacrylate and acrylate esters and related polar monomers, e.g. acrylonitrile, by initiation with carboxylic acid esters formally substituted in the α-position with Li, Na, K, Rb or Cs and containing 3 - 30 C atoms in the straight or branched chain and 1 - 6 ester group in one molecule either alone or in the presence of $C_3$ - $C_{16}$ alkali metal alkoxide with the straight or branched chain. The polymerization or copolymerization is carried out at −80° to +50° C, advantageously at 20° C and the molar ratios of monomers to α-metallo ester 10 to 1500 and alkoxide to α-metallo ester 0.5 to 80. Instead of the pure isolated α-metallo esters also a reaction mixture may be used which was prepared from the alkaline salt of substituted organic amide and non-metallated ester. Aliphatic, cycloaliphatic or aromatic hydrocarbons, organic ethers or their mixtures were used as solvents for both monomers and initiatora. The method is also suitable for preparation of block copolymers of the aforesaid monomers, if the second or further comonomer is always added after the completed polymerization of the preceding monomer and if the subsequent monomers are used either of the equal anionic polymerizability or in the sequence of their increasing anionic polymerizability.

12 Claims, No Drawings

METHOD FOR PREPARATION OF METHACRYLATE AND ACRYLATE POLYMERS AND COPOLYMERS BY ANIONIC POLYMERIZATION

The invention relates to a method for preparation of methacrylate and acrylate polymers and copolymers by the anionic polymerization. Till now, organic compounds of llthium have been used most often for this polymerization, namely either organolithium compounds as n-butyllithium (D.M. Wiles, S. Bywater: Polymer 1962, 3, 175) and 1,1-diphenylhexyllithium (D.M. Wiles, S. Bywater: Trans. Faraday Soc. 1965, 61, 150) or lithium alkoxides, above all tertiary alkoxides (D. Lim, J. Trekoval: Czechosolvak Patent No. 112,248; J. Trekoval, D. Lim: J. Polymer Sci., Part C; 1963, 4, 333). Only a small part (less than 10%) of the initiator is utilized in the formation of growth centers during polymerization initiated by organolithium compounds. On the contrary, the greater part is consumed in side reactions. To reduce the extent of the side reactions and to achieve an acceptable conversion of the monomer, these polymerizations are carried out at the consideralby lowered temperatures (e.g. at $-30°$ C). However, a considerable amount of the initiator has to be used even at these conditions, e.g. the ratio methyl methacrylate (MMA)/ n-buthyllithium equal 30. Such disadvantages do not occur when lithium alkoxides are used which give fair yields of the polymer by action of the low initiator concentrations (e.g. at the ratio MMA/ tert. hexoxide = 230) even at the temperature around $20°$ C. However, the polymerizations initiated by lithium alkoxides proceed very slowly for several hours or days and this may cause difficulties under certain circumstances, e.g. at the polymerization carried out in a through-flow reactor or induced by a stepwise addition of the initiator.

To perform the anionic polymerization of acrylate esters is even more difficult than of methacrylate esters. It is necessary to work mostly at the very low temperatures and the polymer yields are relatively low also in this case (W. K. Busfield, J. M. Methven: Polymer 1973, 14, 137) again due to the great extent of side reactions. Similar situation is also in the anionic polymerization of acrylonitrile (cf. e.f. B. C. Jerusalimskii: Ionnaya polymerizatsiya polyarnych monomerov, Leningrad 1970, o. 146 and following pp.).

A presumption was used in attempts to prepare a more suitable initiator, that the growth center in the anionic polymerization of methacrylic ester has a structure of beta-substituted isobutyrate ester metallated in the alpha-position (D. L. Glsuker, I. Lysloff, E. Stiles: J. Polymer Science 1961, 49, 815) and that polymerization initiators having the structure similar to the structure of the growth center should exhibit advantageous properties.

Some esters of carboxylic acids substituted in the alpha-position (formally because the exact structure is not yet fully elucidated) with lithium, sodium, potassium, rubidium or cesium were prepared in the pure form for this purpose (cf. Czechoslovak Patent no. 153,790 and Patent Appplications PV 8135-73, PV 4690-74). It was further found that the aforesaid alpha-metallo esters form adducts with alkali metal alkoxides and that at combination of alpha-lithio ester with alkoxide of the more heavy alkali metal, an exchange reaction may also proceed according to the equation $$R^1R^2CLiCOOR^3 + R^4OM \rightarrow R^1R^2CMCOOR^3 + R^4OLi$$

(M = Na, K, Rb, Cs).

The new alpha-metallo ester may form in this case an adduct with lithium alkoxide formed. It was found during testing of the above mentioned systems as the initiators of anionic polymerization that the corresponding polymers can be obtained by their action mostly in the very good yield with the relatively high efficiency of the initiator even at the ambient temperature. These polymerizations proceed by high rate, they are complated within several minutes in most cases and one hour can be taken as a final polymerization time.

The used organolithium initiators of the anionic polymerization are generally much more expensive than the corresponding sodium or potassium compounds. Nevertheless, organosodium or potassium compounds have not yet been used in a higher degree for initiation of the anionic polymerization of polar monomers in a hydrocarbon medium. One of the reasons of that is a higher extent of the side reactions of alkylsodium and similar compounds leading to their decay. Another reason of the limited use of these initiators may be their low solubility in hydrocarbons which makes necessary to carry out the polymerizations in the ether medium, e.g. in tetrahydrofuran. But the cost and hazard are substantially higher with tetrahydrofuran than with hydrocarbons.

Block copolymers are generally noted for their physical and chemical properties entirely different from properties of other copolymer types, e.g. random copolymers, and enable to achieve quite unique qualties of polymeric materials (M. Szwarc: Polymer Eng. Science: 1973, 13). The preparation and properties of block copolymers are recently intensively studied for this reason. The cause of the limited practical use of the block copolymers till this time is their difficult preparation which often requires extreme conditions, e.g. the temperature around $-80°$ C. The block copolymers of methacrylate esters and similar polar monomers can be prepared in a relatively easy way by the method described in this Patent specification under advantageous conditions and in the good yield.

Consequently, the new initiation systems remove or reduce the disadvantages of the above mentioned initiators.

An objective of the invention is a method for preparation of methacrylate and acrylate polymers and copolymers by the anionic polymerization consisting in intiation of the polymerization or copolymerization by ester of carboxylic acid formally substituted in the alpha-position with Li, Na K, Rb or Cs which contains 3 to 30 carbon atoms in the straight or branched chain and 1 to 6 ester groups bonded to different carbon atoms in one molecule, possibly also in the presence of Li, Na, K, Rb or Cs alkoxide containing 3 to 16 carbon atoms in the straight or branched chain.

The polymerization or copolymerization is carried out at the temperatures $-80°$ to $+50°$ C, preferably at $+20°$ C, while the molar ratio monomer mixture to alpha-metallo ester is 10 to 1500 and the molar ratio alkaline alkoxide to alpha-metallo ester is 0.5 to 80. Alkaline alkoxides are added in a pure alcohol-free form. As a rule, the initiation system is employed within 5 to 60 minutes from its preparation.

The ester of carboxylic acid formally substituted with the alkali metal in the alpha-position is advantageously used either as the isolated compound or as a fresh reaction mixture containing alpha-metallo ester of high purity, i.e. containing at least 80 molar percent of alpha-metallo ester related to the non-metallated ester used, and prepared e.g. from an alkaline salt of substituted organic amide, as for instance N-lithium diisopropylamide or hexamethyldisilazyl sodium, and the carboxylic acid ester.

Alkali metal alkoxide or its part can be mixed with the monomer just before addition of alpha-metallo ester.

The monomer or the monomer mixture may be advantageously stepwise added to the solution of the initiator, i.e. either to the metallated ester alone or to its mixture with alkali metal alkoxide, or the solution of the given initiators is added stepwise in one or several portions to the solution of monomer or monomer mixture.

Aliphatic, cycloaliphatic or aromatic hydrocarbons, organic ethers, or their mixtures are preferably used as solvents of the monomers and initiators.

During the block copolymerization, the second monomer is added into the polymerization mixture first after the full completion of polymerization of the first monomer with the system prepared from alpha-metallo ester and alkali metal alkoxide, while the different polar monomers are used having the equal ability for anionic polymerization or in the sequence of their increasing anionic polymerizability.

Methacrylic esters, acrylic esters and nitriles derived from acrylic acid are advantageously copolymerized.

The following Table 1 shows some results of polymerizations induced by the initiation system alpha-metallo ester - alkali metal alkoxide and the polymerization initiated by n-butyllithium is also given for comparison which gave almost none polymer under given conditions. As follows from the table, the new initiation systems exhibit a substantially higher efficiency with respect to the polymer yield. Further considerable increase of the initiation system efficiency may be achieved either by lowering the polymerization temperature or by increasing the monomer concentration in the mixture which is economically convenient due to the cut of the solvent amount. The polymerization yield may be also affected by the alkoxide - to -alpha-metallo ester ration, the increasing value of which increases the polymerization yield.

Table 1 shows also results of some polymerizations induced by ethyl alpha-sodio isobutyrate, also in the presence of alkali metal alkoxides, and high yields of polymers obtained by action of these initiation systems are obvious. Further advantage of initiation systems containing alpha-sodio isobutyrate is the lower production cost because the relatively expensive lithium compounds need not be used in their preparation.

The rate of polymerization initated by alpha-metallo ester and their addition products is high; major part of the monomer reacts during several minutes and one hour was always taken as the final polymerization time. These initiators differ expressively in this manner from other initiators, e.g. alkoxide initiators, and are suitable especially for the continuous polymerization process. The continuous method is not only advantageous with respect to the requirements on the inertness of the production equipment in the anionic polymerization but also represents a progressive production method.

Molecular weight of the polymers obtained in this way is rather low and ranges in the order of the tenths of thousands (determined by the GPC in a tetrahydrofuran solution). The ratio $\overline{M}_w/\overline{M}_n$ ranges from 1.60 to 3.70 giving the evidence about the relatively narrow distribution of molecular weight which can be achieved by other anionic polymerization methods under comparable conditions only with difficulties. Stereoregularity of the polymers formed may be controlled with the definite limits.

The described method is suitable also for preparation of random copolymers of methacrylate and acrylate esters. The obtained homo- and copolymers found their application as additives for lubricating oils, raw materials for coating techniques and as components into plastics compositions.

The effect of alkali metal alkoxide on the polymerization yield is well seen from the data in Table 1. We suppose that the effect is based above all on the stabilizing action of alkoxide on the polymerization growth center which is then less liable to the termination reaction. It has been found during the further investigation of properties of the above given initiation systems that the stabilization effect of alkaline alkoxides is such that the major part of the polymerization growth centers remains active even after relatively long time (e.g. for 15 min at 20° C). Such length of the grows center life is substantially higher at the given temperature than in the case of systems without alkoxides as are e.g. simple alkyllithium compounds or also alpha-lithio esters alone. These experiments indicated that the initiation systems based on addition products of alpha-metallo esters with alkaline alkoxides would be especially suitable for preparation of block copolymers of methacrylate esters and similar monomers.

In this method of preparation of block copolymers of methacrylate esters and similar monomers, one monomer is treated with the initiation system containing the addition product of alpha-metallo ester with alkali metal alkoxide. After the period of time necessary for the complete polymerization of the first monomer, i.e. mostly after 1 to 60 min, a portion of the second monomer is added which has the same or higher ability for anionic polymerization in the amount and at the conditions given by the aforesaid ratios. After proper reaction time, the reaction mixture is obtained which contains the block copolymer of both used monomers. The addition of further momoner may be several times repeated again, however with the precaution that the sequence of the added monomers has to be in the order of the equal or increasing abilities to the anionic polymerization.

Block copolymers of the polar monomers of the type AB or ABA, and the like, are obtained in the described way with the rather high regularity of blocks. The yields of block copolymers are mostly very high and the reaction conditions are advantageous, which holds above all for methacrylate esters. The yield and the stereoregularity of the copolymer may be influenced during these block-copolymerizations by the type and amount of the added alkaline alkoxide, as it was shown at the homopolymerization of methacrylate esters (Table 1). Similarly favourable effect on the copolymer yield has also the increased concrentration of monomer or the supressed copolymerization temperature. The polymerization initiated by these systems has high rate and the major part of the monomer reacts during several minutes at 20° C. This is the reason why these initiators are especially suitable for the continuous polymerization process which is advantageously with respect to the requirements of the anionic polymerization on inertness of the production equipment. Molecular weights of the obtained copolymers are about 100,000.

These block copolymers found their use in manufacturing of articles with special physical, chemical and mechanical properties or as additives into plastics compositions and in numerous other cases.

The invention is further illustrated in several examples of performance without limiting the scope of the invention to the given facts.

EXAMPLE 1

All operations with organometallic compounds as well as the polymerization were carried out under the protecting atmosphere, e.g. of nitrogen or argon. The solvents were rectified and then refined by distillation with benzophenone ketyl or, calcium hydride; the monomers were rectified and just before are redistilled in vacuo with calcium hydride.

A solution prepared by mixing of 0.0238 g of ethyl alpha-li-thio isobutyrate (0.0001955 mole), 0.0563 g of sodium tert.butoxide (0.000586 mole) and 4.80 ml of toluene 5 minutes before being used as the initiator, was added under stirring to 65 ml toluene and 4.70 g of methyl methacrylate (0.0469 mole) at 20° C. The mixture was maintained at this temperature for 1 hr while the major part of the monomer was consumed within few minutes. The polymerization was then stopped by addition of 3 ml of methanol and the polymer was precipitated with hexane. The yield of the polymer was 4.22 g i.e. 90% of theory. The polymer exhibited the tacticity of I 28%, H 38%, S 34% and $\overline{M}_w = 70,000$; $\overline{M}_n = 38,000$.

EXAMPLE 2

Similarly as in Example 1, a solution of 4.70 g of methyl methacrylate (0.0469 mole) in 65 ml of toluene was mixed with the solution which was prepared by mixing of 4.80 ml of toluene, 0.0477 g of ethyl alpha-lithio isobutyrate (0.000391 mole) and 0.0438 g of potassium tert-butoxide (0.000391 mole) 5 minutes before being used for initiation. The yield was 4.32 g of the polymer (i.e. 92% of theory) which exhibited the tacticity of I 27%, H 51%, S 22% and $\overline{M}_w = 27,500$; $\overline{M}_n = 15,6000$.

EXAMPLE 3

Similarly as in Example 1, a solution of 4.65 g of n-octyl methacrylate (0.02345 mole) in 32.5 ml of toluene was mixed with the solution which was prepared 45 minutes before being used for initiation by mixing of 4.80 ml of toluene, 0.0238 g of ethyl alpha-lithio isobutyrate (0.0001955 mole) and 0.0160 g of sodium isopropoxide (0.0001955 mole). The polymerization mixture was precipitated with methanol. The yield was 4.42 g of poly(n-octyl methacrylate) (i.e. 95% of theory) which exhibited the tacticity approximately of I 60%, H 30%, S 10% and $\overline{M}_w = 148,000$ (by light scattering).

EXAMPLE 4

Similarly as in Example 1, a solution of 6.675 g of n-butyl methacrylate (0.0469 mole) in 62.7 ml of cyclohexane was mixed with the solution prepared 15 min before being used for initiation by mixing of 4.80 ml of toluene, 0.0238 h of ethyl alpha-lithio isobutyrate (0.0001955 mole) and 0.0563 g of sodium tert.butoxide (0.000586 mole). The polymerization mixture was precipitated with methanol. The yield was 6.27 g of poly(n-butyl methacrylate) (i.e. 94% of theory) which exhibited the approximate tacticity of I 35%, H 35%, S 30% and $\overline{M}_w = 91,000$ (by light scattering).

EXAMPLE 5

Similarly as in Example 1, a solution of 11.93 g of n-dodecyl methacrylate (0.0469 mole) in 56.4 ml heptane was mixed with the solution prepared 15 min before being used for initiation by mixing of 4.80 ml of toluene, 0.0477 g of ethyl alpha-lithio isobutyrate (0.000391 mole) and 0.226 g of sodium tert.butoxide (0.00235 mole). The polymerization mixture was precipitated with methanol. The yield was 11.52 g of poly(n-dodecyl methacrylate) (i.e. 96.5% of theory) which exhibited $\overline{M}_w = 108,000$.

EXAMPLE 6

Similarly as in Example 1, a solution prepared from 0.01193 g of ethyl alpha-lithio isobutyrate (0.0000978 mole), 0.156 g of lithium tert-butoxide (0.00195 mole) and 4.80 ml of toluene was added to 4.70 g of methyl methacrylate (0.0469 mole) in 65 ml of toluene; the molar ratios were: monomer/alpha-lithio ester = 480, alkoxide/alpha-lithio ester = 20. The polymerization was stopped after 1 hr and 2.12 g of the crude polymer was obtained, i.e. 45% of the theoretical yield.

EXAMPLE 7

Similarly as in Example 1, a solution prepared from 0.0477 g of ethyl alpha-lithio isobutyrate (0.000391 mole), 0.0697 g of sodium (-)menthoxide (0.000391 mole) and 4.80 ml of toluene was added to 4.70 g of methyl methacrylate (0.0469 mole) in 65 ml of toluene. The polymerization was stopped after 1 hr and 4.04 g of the crude polymer was obtained, i.e. 86.1% of the theoretical yield.

EXAMPLE 8

Similarly as in Example 1, a mixture prepared from 0.0477 g of ethyl alpha-lithio isobutyrate (0.000391 mole), 0.0806 g of cesium tert.butoxide (0.000391 mole) and 5.80 ml of toluene was added to 4.70 g of methyl methacrylate (0.0469 mole) in 65 ml of toluene. The polymerization was stopped after 1 hr and 3.20 g of the crude polymer was obtained, i.e. 68.1% of the theoretical yield.

EXAMPLE 9

Similarly as in Example 1, 0.0540 g of ethyl alpha-sodio isobutyrate (0.000391 mole) in 4.80 ml of toluene was added under stirring to 65 ml of toluene and 4.70 g of methyl methacrylate (0.0469 mole) at +20° C. The mixture was stirred at the above temperature for 1 hr and the polymerization was then stopped by addition of 2 ml of methanol which may contain hydrochloric acid. The yield was 65.1% of crude poly(methyl methacrylate), the properties of which after refinement are given in the Table.

EXAMPLE 10

Similarly as in Example 1, a solution containing 0.0540 g of ethyl alpha-sodio isobutyrate (0.000391 mole), 0.0313 g of lithium tert.butoxide (0.000391 mole) and 4.80 ml of toluene was added under stirring to 65 ml of toluene and 4.70 g of methyl methacrylate (0.0469 mole) at 20° C. The polymerization was stopped after 1 hr and crude poly(methyl methacrylate) was isolated in the yield of 80.3%, the properties after refinement are given in the Table.

EXAMPLE 11

Similarly as in Example 1, a solution containing 0.0540 g of ethyl alpha-sodium isobutyrate (0.000391 mole), 0.0375 g of sodium tert.butoxide (0.000391 mole) and 4.80 ml of toluene was added under stirring to 65 ml of toluene and 4.70 g of methyl methacrylate (0.0469 mole) at 20° C. The polymerization was stopped after 1 hr and crude poly(methyl methacrylate) was isolated in the yield of 96.7% of theory; the properties after refinement are given in the Table.

EXAMPLE 12

Similarly as in Example 1, the reaction mixture of 0.0717 g of hexamethyldisilazyl sodium (0.000391 mole), 0.0454 g of ethyl isobutyrate (0.000391 mole and 0.0376 g of sodium tert.butoxide (0.000391 mole) in 4.80 ml of toluene was added under stirring to 65 ml of toluene and 4.70 g of methyl methacrylate (0.0469 mole) at 20° C. The polymerization was stopped after 1 hr and crude poly(methyl meythacrylate) was isolated in the yield of 100%; it properties after refinement are given in the Table.

EXAMPLE 13

Similarly as in Example 1 and 12, the reaction mixture of 0.0717 g of hexamethyldisilazyl sodium (0.000391 mole), 0.0454 g of ethyl butyrate (0.000391 mole) and 0.0376 g of sodium tert.-butoxide (0.000391 mole) in 4.80 ml of toluene was added under stirring to 62.7 ml of toluene and 6.67 g of n-butyl methacrylate (0.0469 mole) at 20° C. The polymerization was stopped after 1 hr and crude poly(n-butyl methacrylate) was isolated in the yield of 100%.

EXAMPLE 14

Similarly as in Example 1, a mixture prepared from 0.0603 g of ethyl alpha-potassio isobutyrate (0.000391 mole), 0.0438 g of potassium tert.butoxide (0.000391 mole) and 4.80 ml of toluene was added to 65 ml of toluene and 4.70 g of methyl methacrylate (0.0469 mole). The polymerization was stopped after 1 hr and the crude polymer was obtained in the yield of 4.27 g, i.e. 90.6% of theory.

EXAMPLE 15

Similarly as in Example 1, a solution prepared from 0.157 g of a mixture of oligomers containing mainly trimer to hexamer of methyl methacrylate, 0.0418 g of N-lithium diisopropylamide, 0.113 g of sodium tert-.butoxide and 4.80 ml of toluene was added to a mixture of 4.70 g of methyl methacrylate and 65 ml of toluene. The polymerization was stopped after 1 hr and 1.83 g of the crude polymer was obtained, i.e. 39% of theory.

EXAMPLE 16

Similarly as in Example 1, a solution prepared from 0.0399 g of ethyl propionate (0.000391 mole), 0.0408 g of N-lithium diisopropylamide (0.000391 mole), 0.0376 g of sodium tert.butoxide (0.000391 mole) and 4.80 ml of toluene was added 10 min after mixing to a mixture of 4.70 g of methyl methacrylate and 65 ml of toluene. The yield was 2.22 g of the crude polymer, i.e. 37.2% of theory.

EXAMPLE 17

Similarly as in Example 1, a solution prepared from 0.02385 g of ethyl alpha-lithio isobutyrate (0.0001955 mole), 0.1127 g of sodium tert.butoxide (0.001174 mole) and 4.80 ml of toluene was added to a mixture of 4.70 g of methyl methacrylate (0.0469 mole), 6.67 g of n-butyl methacrylate (0.0469 mole) and 65 ml of toluene. After 1 hr, the reaction mixture was precipitated with methanol and 10.32 g of the crude random copolymer of methyl and n-butyl methacrylates was obtained, i.e. 90.8% of theory. The copolymer exhibited after refinement $\overline{M}_w = 68,500$ and contained both monomers in the equillibrium ratio according to NMR spectrum.

EXAMPLE 18

Similarly as in Example 1, a solution of 4.485 g of n-butyl acrylate (0.0350 mole) in 47 ml of toluene was mixed with a solution prepared from 0.0713 g of ethyl alpha-lithio isobutyrate (0.000584 mole), 0.365 g of sodium tert.butoxide (0.00351 mole) and 7.50 ml of toluene. The polymerization was stopped after 1 hr, the reaction mixture was evaporated to dryness, the residue was dissolved in methanol and the polymer was precipitated by dilution with water. The yield was 1.84 g of crude poly(n-butyl acrylate), i.e. 41% of theory.

EXAMPLE 19

Similarly as in Example 1, a solution of 2.49 g of acrylonitrile (0.0469 mole) in 65 ml of toluene was mixed with a solution prepared from 0.0477 g of ethyl alpha-lithio isobutyrate (0.000391 mole), 0.0376 g of sodium tert-butoxide (0.000391 mole) and 4.80 ml of toluene. After one hour, the reaction was stopped with methanol and precipitated polymer was isolated. The yield was 0.77 g of crude polyacrylonitrile, i.e. 31% of theory.

EXAMPLE 20

A toluene solution (5.02 ml) containing 0.0477 g of ethyl alpha-lithio isobutyrate (0.000391 mole) and 0.226 g of sodium tert.-butoxide (0.00235 mole) was added under stirring to 62.7 ml of toluene and 6.67 g of n-butyl methacrylate (0.0469 mole) at +20° C. The mixture was allowed to polymerize for 4 minutes, then 4.70 g of methyl methacrylate (0.0469 mole) was added and stirring was continued for further 60 minutes. Methanol (2 ml) was then added and the copolymer was isolated by precipitation into methanol. The yield was 11.23 g of the crude copolymer, i.e. 98.7%.

Analysis of the crude copolymer: A toluene solution of the crude copolymer was precipitated with petroleum ether. The eventually present homopolymer of n-butyl methacrylate should be removed in the this way because it is soluble under given conditions. The insoluble portion obtained was filtered off, washed and dried. The yield of copolymer was 70 wt.%. The mother liquor after precipitation gave by evaporation to dryness 28 wt. % of the residue. By means of NMR spectra it was proved that the residue after evaportion is formed by the poly(n-butyl methacrylate) homopolymer. The fact that about one half of poly(n-butyl methacrylate) formed was impossible to extract from the product proved the existence of the copolymer. The insoluble part is according to NMR spectra the copolymer of methyl methacrylate - n-butyl methacrylate in the molar ratio approximately 2 : 1. After comparison with NMR spectra of the analogous random copolymer and a mixture of methyl methacrylate and n-butyl methacrylate homopolymers, this copolymer was proved to the block copolymer. Molecular weight was determined by means of the light scattering and $\overline{M}_w = 85,000$ was found.

Consequently, the crude copolymer consisted of 71.7 wt.% of the block copolymer of methyl methacrylate and n-butyl methacrylate (molar ratio 2:1 wt.% of poly(n-butyl methacrylate).

EXAMPLE 21

Similarly as in Example 1, 3.04 ml of toluene solution containing 0.0286 g of ethyl alpha-lithio isobutyrate (0.000236 mole) and 0.136 g of sodium tert.butoxide (0.00141 mole) was added under stirring to 34 ml of toluene and 7.17 g of n-dodecyl methacrylate (0.0282 mole) at +20° C. After 5 minutes, 2,83 g of methyl methacrylate (0.0282 mole) was added and the mixture was further stirred for 1 hr. Then, 2 ml of methanol was added and the polymer was isolated by precipitation into methanol. The greasy product was dried at 90 ° C/1 mm Hg to the constant weight; the yield was 8.80 g of the crude methyl methacrylate - n-dodecylmethacrylate copolymer, i.e. 88 wt.%.

EXAMPLE 22

Similarly as in Example 1, 3.53 ml of toluene solution containing 0.0333 g of ethyl alpha-lithio isobutyrate (0.000274 mole) and 0.158 g of sodium tert.butoxide (0.00164 mole was added under stirring to 43.8 ml of toluene and 4.68 g of n-butyl methacrylate (0.0328 mole) at +20° C. Acrylonitrile (1.743 g, i.e. 0.0328 mole) was added after 5 min and the mixture was stirred 1 hr. Then, 3 ml of methanol was added and the polymer was isolated by precipitation imto methanol. The yield was 5.08 g of the crude powdered copolymer, i.e. 80 wt.% (further 1.15 g of the product was obtained by evaporation of the mother liquor, so that the total yield of the polymeric material was 6.23 g, i.e. 97.1 wt.%).

Analysis of the crude copolymer: The crude copolymer was shaken tentimes with toluene and the insoluble portion was always separated by centrifugation. The extracted insoluble portion was dried and its yield was 19.3 wt.% and consisted of the n-butyl methacrylate - acrylonitrile block copolymer with high content of acrylonitrile according to IR spectra and analogously to other copolymerizations. The combined mother liquors were evaporated to dryness giving 79.6 wt.% of an orange-brown solid material which was formed by poly(n-butyl methacrylate) with the small amount of acrylonitrile bonded in the form of block copolymer according to IR spectra.

TABLE 1

Polymerization of methacrylate esters (R-MA) in the toluene solution (0.63 mole $1^{-1}$) at 20° C initiated by ethyl alpha-metallo isobutyrate in the presence of alkali metal alkoxides; polymerization time 1 hr.

| R-MA R | Initiation system | Ratio R-MA to α-lithio ester | Crude polymer yield, % | $\overline{M}_w \times 10^{-3}$ | $\overline{M}_n \times ^{-3}$ | $\overline{M}_w/\overline{M}_n$ | Tacticity, % I | H | S |
|---|---|---|---|---|---|---|---|---|---|
| $CH_3$ | $C_4H_9Li$ | 120 | 0 | — | — | — | — | — | — |
| $CH_3$ | $(CH_3)_2CLiCOOC_2H_5$ | 120 | 41.3 | 56 | — | — | 65 | 24 | 11 |
| $CH_3$ | $(CH_3)_2CLiCOOC_2H_5 + (CH_3)_3COLi$ | 120 | 53.1 | 76 | 21 | 3.63 | 74 | 19 | 7 |
| $CH_3$ | $(CH_3)_2CLiCOOC_2H_5 + (CH_3)_3CONa$ | 120 | 82.4 | 28.1 | 14.8 | 1.90 | 48 | 36 | 16 |
| $CH_3$ | $(CH_3)_2CLiCOOC_2H_5 + (CH_3)_3COK$ | 120 | 92 | 27.5 | 15.6 | 1.76 | 27 | 51 | 22 |
| $CH_3$ | $(CH_3)_2CLiCOOC_2H_5 + (CH_3)_3CONa$ | 240 | 36.3 | 73 | 35 | 2.05 | 53 | 34 | 13 |
| $CH_3$ | $(CH_3)_2CLiCOOC_2H_5 + 3(CH_3)_3CONa$ | 240 | 90 | 70 | 38 | 1.85 | 28 | 38 | 34 |
| $CH_3$ | $(CH_3)_2CLiCOOC_2H_5 + 5.5(CH_3)_3CONa$ | 240 | 100 | 58 | 36 | 1.60 | 20 | 35 | 45 |
| $C_4H_9$ | $(CH_3)_2CLiCOOC_2H_5 + 3(CH_3)_3CONa$ | 240 | 94 | $91^a$ | — | — | 35 | 35 | 30 |
| $C_8H_{17}$ | $(CH_3)_2CLiCOOC_2H_5 + (CH_3)_3CHONa$ | 120 | 95 | $148^a$ | — | — | 60 | 30 | 10 |
| $C_{12}H_{25}$ | $(CH_3)_2CLiCOOC_{91.2}H_5 + 6(CH_3)_3CONa$ | 120 | 96.5 | $108^a$ | — | — | — | — | — |
| $CH_3$ | $(CH_3)_2CNaCOOC_2H_5$ | 120 | 65.1 | $46^a$ | — | — | 54 | 36 | 10 |
| $CH_3$ | $(CH_3)_2CNaCOOC_2H_5 + (CH_3)_3COLi$ | 120 | 80.3 | — | — | — | 54 | 33 | 13 |
| $CH_3$ | $(CH_3)_2CNaCOOC_2H_5 + (CH_3)_3CONa$ | 120 | 96.7 | $32^a$ | — | — | 33 | 38 | 29 |
| $CH_3$ | $(CH_3)_2CNaCOOC_2H_5 + (CH_3)_3CONa^b$ | 120 | 100 | — | — | — | 27 | 38 | 35 |
| $C_4H_9$ | $(CH_3)_2CNaCOOC_2H_5 + (CH_3)_3CONa^b$ | 120 | 100 | — | — | — | — | — | — |

Notes:
aLight scattering method
bEthyl alpha-sodio isobutyrate was used as the reaction mixture of hexametylidisilazyl sodium and ethyl isobutyrate

We claim:

1. A method for the preparation of acrylate and methacrylate polymers and copolymers by anionic polymerization comprising the step of polymerizing at least an acrylate or methacrylate monomer in the presence of an initiating system selected from the group consisting of an alpha-lithium carboxylic acid ester and an alkoxide of a heavier alkali metal selected from the group consisting of sodium, potassium, rubidium and cesium, a carboxylic acid ester substituted in the alpha-position with an alkali metal selected from the group consisting of sodium, potassium, rubidium and cesium and a carboxylic acid ester substituted in the alpha-position with an alkali metal selected from the group consisting of sodium, potassium, rubidium, and cesium and an alkoxide of an alkali metal selected from the group consisting of lithium, sodium, potassium, rubidium and cesium, said carboxylic acid ester containing 3 to 30 carbon atoms in the straight or branched chain and 1 to 6 ester groups bonded to different carbon atoms and said alkoxide containing 3 to 16 carbon atoms in the straight or branched chain.

2. The method of claim 1, wherein the polymerization is carried out at a temperature in the range from −80° and 50° C.

3. The method of claim 1, wherein the molar ratio of said monomer to said carboxylic acid ester is from 10 to 1500 and the molar ratio of said alkoxide to said carboxylic acid ester is from 0.5 to 80.

4. The method of claim 1, wherein said carboxylic acid ester is present as a fresh reaction mixture prepared from an organic amide having an alkali metal attached to the nitrogen atom thereof and the non-metallated ester.

5. The method of claim 1, wherein said carboxylic acid ester is used as a fresh reaction mixture prepared from hexamethyldisilazyl sodium and the non-metallated ester.

6. The method of claim 1, wherein said initiating system includes an alkali metal alkoxide and said alkoxide is mixed with the monomer prior to the addition of said carboxylic acid ester thereto.

7. The method of claim 1, wherein said monomer is added step-wise to said initiating system.

8. The method of claim 1, wherein a solvent for said monomer and said initiating system is utilized and is selected from the group consisting of aliphatic, cycloaliphatic and aromatic hydrocarbons, organic ethers and mixtures thereof.

9. The method of claim 1, wherein said monomer includes a member selected from the group consisting of esters of methacrylic acid, esters of acrylic acid, nitriles of acrylic acids and mixtures thereof.

10. The method of claim 1, wherein said initiating system consists of an alpha-lithium carboxylic acid ester and an alkoxide of a heavier alkali metal.

11. The method of claim 1, wherein said initiating system consists of a carboxylic acid ester substituted in the alpha-position with an alkali metal selected from the group consisting of sodium, potassium, rubidium and cesium.

12. The method of claim 1, wherein said initiating system consists of a carboxylic acid ester substituted in the alpha-position with an alkali metal selected from the group consisting of sodium, potassium, rubidium and cessium and an alkali metal alkoxide.

* * * * *